Patented Oct. 6, 1931

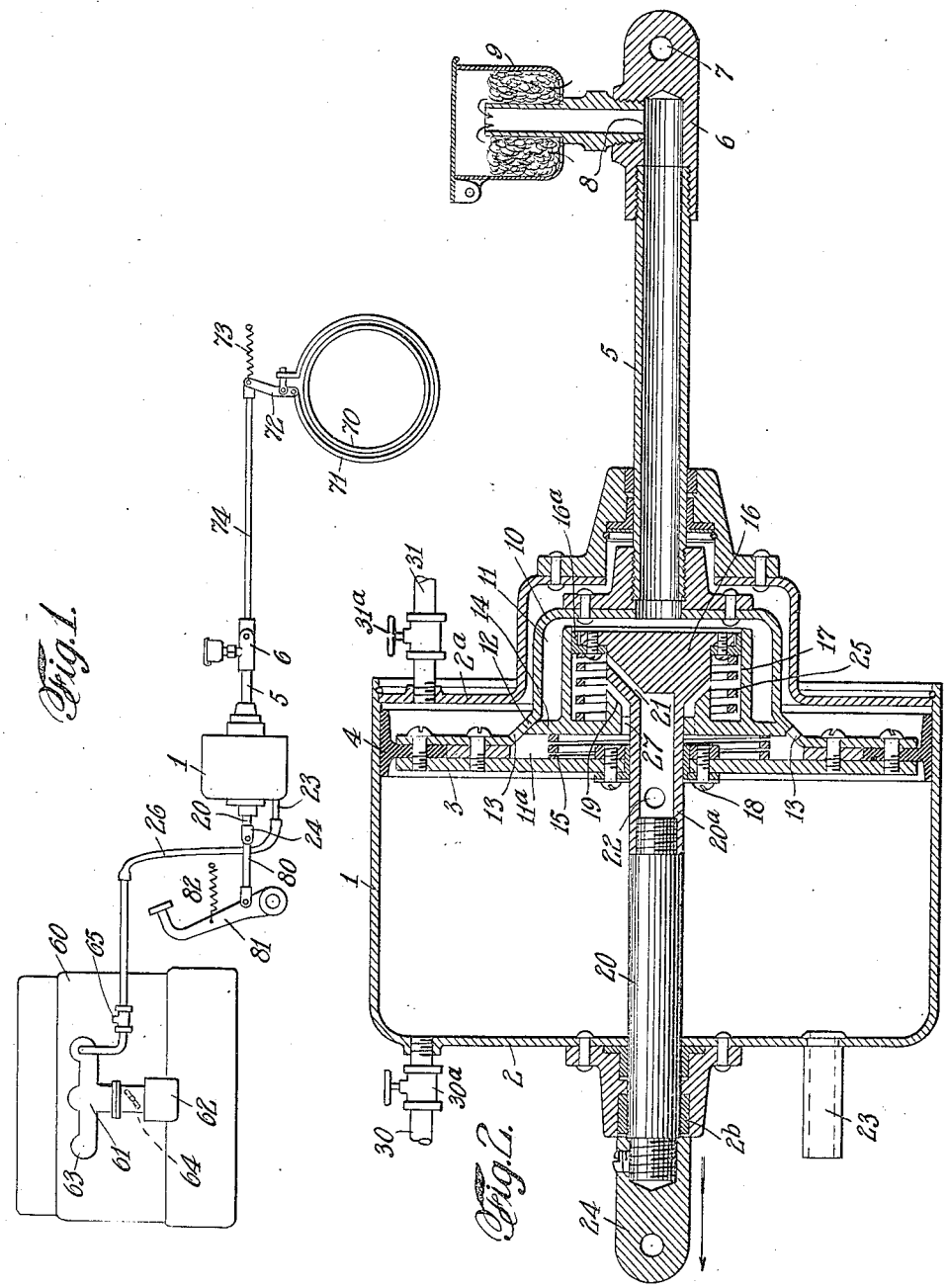

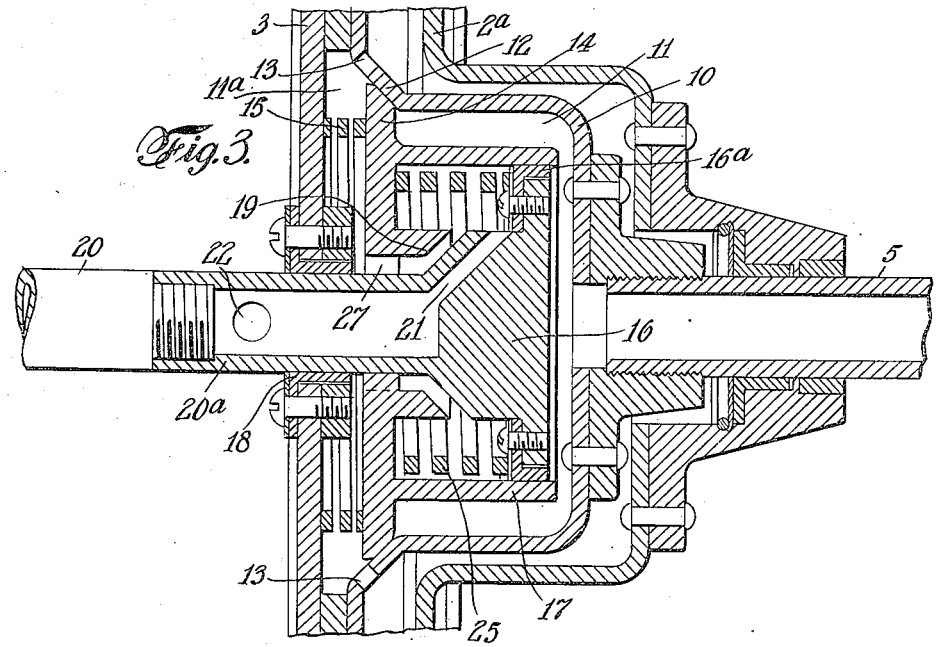
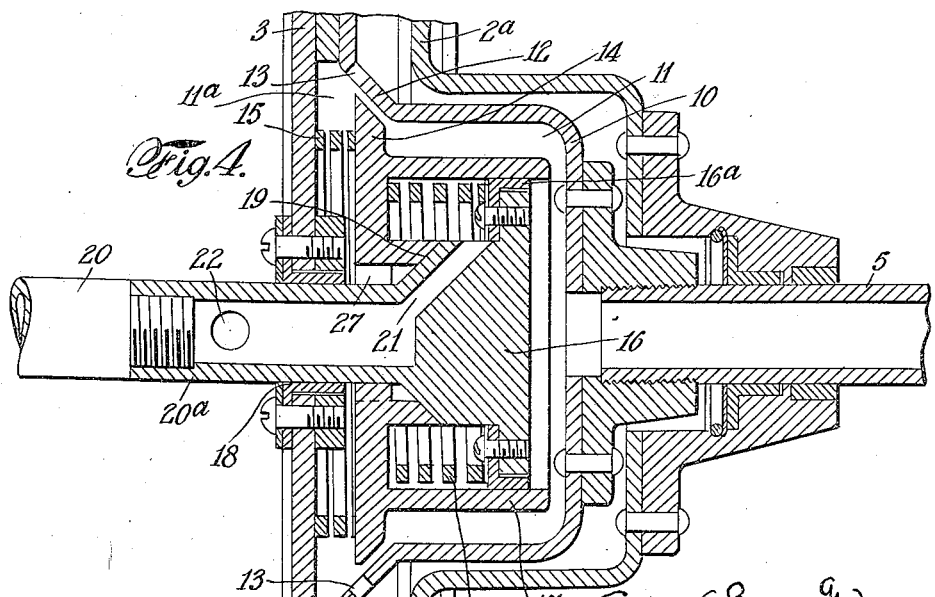

1,826,417

UNITED STATES PATENT OFFICE

CALEB S. BRAGG AND VICTOR W. KLIESRATH, OF LONG ISLAND CITY, NEW YORK, ASSIGNORS TO BRAGG-KLIESRATH CORPORATION, OF NEW YORK, N. Y., A CORPORATION OF NEW YORK

POWER ACTUATOR

Application filed November 7, 1927, Serial No. 231,725. Renewed December 3, 1930.

Our invention consists in the novel features hereinafter described, reference being had to the accompanying drawings, which show several embodiments of the invention, selected by us for purposes of illustration, and the said invention is fully disclosed in the following description and claims.

Our invention is an improvement in power actuators for use in connection with automotive vehicles and especially adapted for operating the brake mechanism thereof, and it has for its object to provide means whereby the operator is enabled to determine by variations in the resistance to the operator operated part connected with the valve mechanism for controlling the actuator, as for example, by the variations in pressure against his foot, where a pedal lever is employed to actuate the valve mechanism, how much pressure the piston of the actuator is exerting on the brakes or other part to be actuated.

According to our present invention, variations in the differential of fluid pressure on the higher pressure valve and lower pressure valve operate to increase the initial resistance to the movement of the operator operated part, as the higher pressure fluid is admitted to the cylinder of the actuator, and pressure accumulates therein, to effect a power stroke of the piston of the actuator to apply the brakes, or actuate the part connected with the piston.

Referring to the accompanying drawings,

Fig. 1 is a diagrammatic view illustrating an installation in an automotive vehicle, of a power actuator connected with brake mechanism for the vehicle and deriving its suction from the intake manifold of an internal combustion engine for propelling the vehicle, and embodying our invention.

Fig. 2 is an enlarged sectional view of the actuator shown in Fig. 1.

Fig. 3 is a still further enlarged sectional view of the valve mechanism of the actuator, showing the positions of the valves in the normal or retracted position of the piston.

Fig. 4 is a view similar to Fig. 3, showing the position of the valves when moved to effect a power stroke of the piston and apply the brakes.

In the drawings, we have shown one embodiment of the invention in which the valve mechanism for the actuator is located in the piston thereof, and constructed to normally maintain the piston submerged in vacuum when the valve mechanism is in the off or released position. The actuator comprises in this instance the cylinder, 1, closed at both ends by heads, 2 and 2ª, and provided with a piston, 3, having the usual gasket, 4. The piston hub, indicated at 10, is shown provided with a chamber, 11, or valve casing, within the hub, and provided with a valve seat, 12, engaged by a valve, 14, which in this instance is the higher pressure valve, and which when seated, separates the outer portion, indicated at 11ª, which latter portion is at all times in communication with the portion of the cylinder in rear of the piston by means of ports or passages, 13. The valve, 14, is of considerable diameter, and is provided on its rear face with a cylindrical recess, 17, in which the other controlling valve, 16, in this instance the suction or lower pressure valve, of mushroom shape, and having a sealing engagement with the cylindrical walls of the chamber or recess, 17, in this instance by means of an annular packing or gasket, 16ª. The interior of the chamber, 17, is provided with a seat, 19, engaged by the valve, 16, when the latter is in closed position, and the said valve is provided with a hollow stem, 20ª, communicating with the chamber, 17, by a passage, 21, independently of the valve seat and communicating also with the source of lower pressure, in this instance by means of an aperture or apertures, 22, communicating with the cylinder forward of the piston, which is provided with an outlet aperture, 23, communicating with the source of lower pressure.

The valve, 14, is normally held seated by yielding means, as a spring, 15, (or springs) interposed between the inner face of the valve and a part connected with the piston, and therefore connected with the part to be actuated through the hollow piston rod, 5, connected with the piston hub, 10. The piston rod, 5, preferably communicates, as shown, with the interior of the valve casing, 11, and is provided at its outer end with a cap, 6, having an attaching lug or ear, 7, for connecting it with a part to be actuated, and also having an air inlet, 8, for admitting air or other higher pressure fluid, and provided in this instance with a dust cap, 9. Obviously the inlet aperture, 8, could be connected with a source of pressure higher than atmospheric, if desired.

Auxiliary resistance means, as a spring, 25, interposed between the two valves, and located within the chamber, 17, serves to normally hold the valve, 16, in open position, as indicated in Figs. 2 and 3, and also to transmit to the larger valve, 14, the fluid pressure on the outer face of the valve, 16, and the pressure exerted by the operator to close the valve, 16, the spring, 15, is sufficiently strong so that the valve, 16, may always be seated before the valve, 14, opens. The stem, 20ª, of the valve, 16, extends through a sealing member, 18, in the piston, 3, and is connected to a valve actuating part, 20, extending through a sealing member, 2ᵇ, in the cylinder head, 2, and provided with means for connecting it with an operator operated part.

It will be seen that the higher pressure valve, 14, is at all times subjected on its outer face to the higher pressure fluid, and that the lower pressure valve, 16, is likewise subjected at all times to the higher fluid pressure, which is transmitted to the valve, 14, through the spring, 25, interposed between said valves. The inner surface or face of the higher pressure valve, 14, is subjected to the pressure in the portion, 11ª, of the valve casing or chamber, 11, which is in constant communication with the cylinder in rear of the piston, and when the lower pressure, or suction valve, 16, is opened, the inner face of said valve will be subjected to the lower fluid pressure, and the higher pressure valve, 14, will also be subjected to the lower fluid pressure at such time, as the chamber, 17, within the valve, 14, communicates with the portion, 11ª, of the valve casing, 11, through an aperture, 27, within the valve seat, 19, which is controlled by the valve, 16. When the valve, 16, is seated the marginal portions of its inner face, exterior to the valve seat, will still be subjected to the lower fluid pressure, which acts at all times upon these marginal portions. The area of the rear face of the valve, 16, and the calibration of its auxiliary resistance spring, 25, are so related that said spring will hold the valve, 16, in open position away from its seat against the maximum differential of pressures on the opposite faces of the valve, 16, operating in a direction to seat the valve, 16. The diameter of the valve, 14, and the calibration of the spring, 15, are so related that the spring, 15, will hold the valve, 14, seated against the maximum differential of fluid pressures on the inner face of the valve, 14, and the outer faces of the valves, 14 and 16, which maximum differential of fluid pressures will preferably very nearly counterbalance the pressure exerted on the valve, 14, by the spring, 15, but the spring, 15, has sufficient power to hold valve, 14, seated against the tension of spring, 25, permitting the valve, 16, to be seated, without opening the valve, 14. The stop for the open position of valve, 16, is its engagement with the piston part, 10, at which time the pressure of spring, 25, is neutralized by its connection on both sides with the piston. The spring, 15, has sufficient power to offer material resistance to the movement of the operator operated part in a direction to move the valve, 15, away from its seat, when the differential of fluid pressures on the inner face of the valve, 14, and the outer faces of the valves, 14 and 16, is at maximum, or in other words, said pressures are substantially equalized. It will also be seen that the seat, 12, for the valve, 14, forms a stop to limit its closing movement to which the pressure of the spring, 15, is transferred whenever the valve, 14, is closed.

In Fig. 1 the power actuator is shown diagrammatically installed in an automotive vehicle in connection with an internal combustion engine for propelling the vehicle, and arranged to operate the brake mechanism of the vehicle. In this figure, the engine is represented at 60, provided with the usual carburetor, 62, and suction passage, 61, including the intake manifold, 63, the suction passage being provided with the usual throttle valve, 64. The power actuator cylinder is mounted on the chassis of the vehicle and the outlet aperture, 23, from the cylinder forward of the piston is connected by suction pipe, 26, with the suction passage of the engine between the throttle valve and the engine cylinders, and preferably with the intake manifold, 63, as shown, the suction pipe being preferably provided with a check valve, 65, opening in a direction toward the manifold. The piston rod, 5, of the actuator is connected with the part to be actuated, in this instance brake mechanism of the vehicle, indicated diagrammatically in Fig. 1. The brake mechanism may be of any preferred type, operating in connection with two or more wheels of the vehicle. In Fig. 1 it is diagrammatically as a brake drum, 70, provided with a brake band, 71, brake operating lever, 72, and retracting spring, 73. The lever, 72, is connected by link, 74, with the piston rod, 5, of the actuator. The operator operated part is in this instance a foot lever, or pedal lever, 81, provided, if desired, with the usual retracting spring, 82, to counterbalance the weight and friction of the operator operated part, and is connected by link, 80, with the valve actuating part, 20.

When the parts are in normal or released position, as indicated in Figs. 2 and 3, and the engine is running, the suction of the manifold will exhaust air from the cylinder on both sides of the piston and maintain the piston in a state of rarefication, the air in the cylinder forward of the piston being withdrawn directly therefrom and the air in rear of the piston being withdrawn through the ports, 13, in the piston hub, 10, the portion, 11ª, of the valve casing, or chamber, 11, forward of the valve, 14, the passage, 27, chamber, 17, of the valve, 14, passage, 21, in the valve, 16, the hollow valve stem, 20ª, and apertures, 22, therein, into the cylinder forward of the piston, from whence it is withdrawn to the suction pipe, 26. In this position of the valve mechanism it will be seen that the valve, 14, is exposed on its inner face to suction, and upon its outer face to the higher pressure fluid, in this case the atmosphere, and also to the atmospheric pressure on the outer face of the suction valve, 16, thus providing the maximum differential of fluid pressures on the valve, 14, exerted in a direction to open the valve and overcome by the pressure of the spring, 15, which holds it closed. The suction valve, 16, is also held open by the spring, 25, against the maximum differential of fluid pressures thereon. The spring, 25, is also nearly counterbalanced by the maximum differential of fluid pressures on the valve, 16, so that a very light initial pressure is required upon the foot pedal to move the valve, 16, against the pressure of spring, 25, into closed position, (which brings the valve actuating part into operative connection with the valve, 14) and move the valve, 14, in a direction away from its seat, or in other words, to open it. As soon, however, as the valve, 14, opens the higher pressure fluid will pass into the portion, 11ª, of the chamber, 11, and into the cylinder in rear of the piston, and build up pressures in rear of the piston, and in the portion, 11ª, of chamber, 11, thereby gradually reducing the differential fluid pressures, to which said valve is subjected and gradually transferring the retracting force or resistance of the spring, 15, to the operator operated part, in a direction to resist the forward movement thereof. The chamber, 17, is connected at all times with the suction source, even when the valve, 16, is seated and valve, 14, is open. Therefore the areas of both valves represented by the annular chamber, 17, are neutralized so far as the suction is concerned and the rear face of the suction valve becomes virtually a portion of the rear pressure face of the atmospheric valve, and as the suction valve is seated and there is an equalization of fluid pressures on opposite sides of the valves, the resistance of the suction spring, 25, is added to the operator operated part. Therefore, the operator meets gradually increasing resistance of the main resistance means for the higher pressure valve, and the resistance means for the lower pressure valve, as the pressure builds up in the cylinders, and moves the piston forward to apply the brake mechanism, and the greater the force exerted upon the braking surfaces, the greater the pressure built up in the cylinder in rear of the piston to effect that braking, and the greater the force which must be exerted by the operator's foot on the pedal to keep the suction valve closed and the air inlet valve open to attain that pressure.

It is also to be noted that all the force exerted by the driver in overcoming the resistance of the springs, 15 and 25, is exerted in the direction of movement of the piston in effecting its power stroke and will be transmitted to the piston therefor and to the brake mechanism (or other part to be operated) in the direction of the power stroke of the piston, so that this force which is required to overcome these springs is not lost, but is conserved and applied to the part to be operated.

As soon as the forward movement of the operator's foot and the pedal, ceases, the piston will overtake the valve actuating part, 20, permitting the higher pressure valve, 14, to close without opening the suction valve, 16, and thus holding the brakes applied. As soon as the valve, 14, closes, the pressure of the resistance spring, 15, will be transferred from the operator operated part to the valve seat, 12, and the operator's foot is relieved from the pressure of this spring, and has only to overcome the resistance of the spring, 25. The operator is thus relieved of the greater portion of the pedal pressure in holding the brakes applied for a considerable length of time, as in prolonged or continued braking. If the operator wishes to effect a further pressure on the braking surfaces, however, it will be necessary for him to exert sufficient pressure to overcome the increased resistance of the spring, 15, and reopen the valve, 14. The pressure of the resistance spring will become maximum when the pressure in the cylinder in rear of the piston is equal to the higher fluid pressure, in this case atmospheric pressure.

It will also be seen that as all physical force of the operator is applied to the piston in the direction of its power stroke, that after the brake mechanism has been applied to the full capacity of the power actuator, the operator may, by exerting further pressure on the pedal, bring the valve, 14, into engagement with the portion of the piston, 3, and apply his physical force in addition to that of the actuator, and in like manner may apply the brakes by physical force alone in case of failure of power, in which case the first portion of the movement will operate the valve mechanism as before described, and vent the cylinder.

To release the brakes it is only necessary for the operator to release the pedal lever, 81, sufficiently to permit the suction valve to be opened by the spring, 25. This will effect an almost immediate equalization of pressures within the cylinder, in the form of actuator herein shown, by transfer from the high pressure side to the low pressure side, permitting an immediate release of the brake mechanism under the action of its retracting means and connecting both ends of the cylinder with the suction passage of the engine and withdrawing the air previously admitted to apply the brakes, the piston, and brake mechanism, being returned to their normal or released position, or retracted positions by the retracting means, as the spring, 73.

It will be seen that by our invention the operator is enabled to determine very accurately the amount of power which is being applied to the brake mechanism by the actuator, by the variations in the resistance to the operator operated part for actuating the valve mechanism in substantially the same manner as when operating ordinary hand or foot operating brake mechanism, while the brakes are actually applied by the power of the actuator, and as before stated, the operator is relieved from this increased resistance, that is to say, that of the spring, 15, by the seating of the valve, 14, to hold the brakes applied.

By reason of the fact that the force exerted by the operator in operating the valve mechanism in opposition to the springs, 15 and 25, is conserved and applied to the piston in the direction of its power stroke, a cylinder of smaller size and less weight may be employed to do the same work as a larger and heavier one with economy of manufacture and convenience in the installation, and correspondingly smaller quantities of air will be withdrawn into the suction passage of the engine with each application of the brake mechanism with less liability of interfering with the operation of the engine, or stalling it if idling.

In the preceding figures we have illustrated an embodiment of our invention in a power actuator, the piston of which is submerged in vacuum when in the retracted position, the valve mechanism being installed in a valve casing which is a part of the piston hub. It will be obvious, however, that the valve mechanism for the actuator may be located in a valve casing exterior to the piston and cylinder of the actuator and connected, for example, in the linkage between the operator operated part and the brake mechanism or other part to be operated, the valve casing moving with the piston and being connected with the cylinder to the rear of the piston and with the suction passage by flexible connections extending from suitable ports corresponding to a single port, 13 and port, 23, of the cylinder, in a manner similar to that illustrated in our former application for Letters Patent of the United States filed June 17, 1927, and given Serial No. 199,477.

It will be obvious that more than one cylinder could be controlled by the valve mechanism by suitable pipe connections between the corresponding parts of the several cylinders. For example, we have shown in Fig. 2, the cylinder, 1, provided at its opposite ends with pipes, 30 and 31, for connecting it with the corresponding portions of one or a plurality of valveless cylinders having pistons therein, so that the pistons of all the connected cylinders will be operated simultaneously under the control of the single valve mechanism. The pipes, 30 and 31, are shown provided with cut off cocks, 30$^a$ and 31$^a$, so that the said pipes may be closed when not in use.

It is also obvious that our invention is applicable in connection with any type of power actuator which comprises relatively movable coacting members, at least one of which is connected with the part to be operated and with the casing of the valve mechanism.

What we claim and desire to secure by Letters Patent is:—

1. Valve mechanism for controlling the operation of fluid pressure actuators comprising among its members a valve casing, provided with a valve seat within the same, and a higher fluid pressure inlet communicating with a portion of the casing on one side of said seat, and a passage communicating with a portion of said actuators and the casing on the other side of said seat, a higher pressure valve and a lower pressure valve of different sizes in said casing, said higher pressure valve being the larger and normally engaging said seat and having opposite faces of unequal effective pressure areas, a portion of one of said faces being always exposed to the higher fluid pressure, said valve face being provided with an aperture, a recess and a valve seat, and the lower pressure valve being movable within said recess with respect to the higher pressure valve into and out of engagement with said seat and having its outer face subjected at all times to the higher fluid pressure, sealing means between the low pressure valve and said recess, a hollow valve stem for said lower pressure valve passing through said aperture and provided with an aperture communicating with said recess, and an aperture communicating with a source of lower fluid pressure, the other face of said higher pressure valve being exposed to the lower fluid pressure when said valve is seated, and the lower pressure valve is open, yielding resistance means on the opposite face of the higher pressure valve from said recess for normally seating said valve against the maximum differential of fluid pressures thereon, said resistance means being capable of offering material resistance to the movement of said valve in a direction away from its seat when the fluid pressures on opposite faces of said valve are equalized, and being nearly counterbalanced by the maximum differential of fluid pressures thereon and being interposed between said valve and a part connected with the valve casing, said valve stem being provided with means for connecting it with an operator operated part, the movement of said operator operated part in a direction to seat said lower pressure valve effecting a connection between said valve and said higher pressure valve in a direction to open the higher pressure valve.

2. In a power actuator, the combination of a cylinder closed at both ends, a piston therein, provided with means for connecting it with a part to be operated, controlling valve mechanism, and means for connecting the cylinder with sources of higher and lower fluid pressures under the control of said valve mechanism, said valve mechanism comprising among its members a valve casing operatively connected with and movable with the piston and provided with a valve seat within the casing and an aperture on each side of said seat, one communicating with the higher fluid pressure source and the other communicating with a portion of said cylinder, a higher pressure valve and a lower pressure valve in said casing movable with and with respect thereto and with respect to each other, the higher pressure valve being larger than the lower pressure means and normally engaging said seat and having opposite faces of unequal effective pressure areas, a portion of one of said faces being exposed to the higher fluid pressure, and the other face being exposed to the lower fluid pressure when the valve is seated and the valve mechanism is in normal or released position, yielding resistance means for normally seating said valve against the maximum differential of fluid pressures, thereon, said resistance means being capable of offering material resistance to the movement of said valve in a direction away from its seat, when the fluid pressures on said valve are equalized and being nearly counterbalanced by the maximum differential of fluid pressures thereon, and being interposed between said valve and a part connected with the valve casing, said valve being provided on the face opposite that engaged by said resistance means with a recess provided with an aperture and a valve seat, the lower pressure valve being movable into and out of engagement with said seat and having its outer face subjected at all times to the higher fluid pressure, and provided with sealing means preventing the passage of higher fluid pressure into said recess when the higher pressure valve is closed, and having its inner face subjected to the pressure within said recess, auxiliary yielding resistance means interposed between said valves and having sufficient power to hold said second mentioned valve unseated against the maximum differential of fluid pressures on the opposite faces of said valve, a hollow valve stem for said second mentioned valve provided with an aperture within the valve casing communicating with said recess, and an aperture exterior to said valve casing communicating with said source of lower pressure, an operator operated part connected with said valve stem, the movement of said operator operated part to close said lower pressure valve effecting the connection of the operator operated part with said higher pressure valve, to permit the opening of the latter, to effect a power stroke of the actuator piston, the initial resistance of said main and auxiliary resistance means to the said movements of said valves being increased substantially in proportion to the variation in the differential of fluid pressures on said valves, to enable the operator to determine the amount of pressure applied to the actuator piston and the part connected therewith.

3. In a power actuator, the combination of a cylinder closed at both ends, a piston therein, provided with means for connecting it with a part to be operated, controlling valve mechanism, and means for connecting the cylinder with sources of higher and lower fluid pressures under the control of said valve mechanism, said valve mechanism comprising among its members a valve casing operatively connected with and movable with the piston and provided with a valve seat within the casing and an aperture on each side of said seat, one communicating with the higher fluid pressure source and the other communicating with a portion of said cylinder, a higher pressure valve and a lower pressure valve in said casing movable with and with respect thereto and with respect to each other, the higher pressure valve being larger than the lower pressure valve and normally engaging said seat and having opposite faces of unequal effective pressure areas, one of said faces being exposed to the higher fluid pressure, and the other face being exposed to the lower fluid pressure when the valve is seated and the valve mechanism is in normal or released position, yielding resistance means for normally seating said valve against the maximum differential of fluid pressure thereon, said resistance means being capable of offering material resistance to the movement of said valve, in a direction away from its seat, when the fluid pressures on said valve are equalized and being nearly counterbalanced by the maximum differential of fluid pressures thereon, and being interposed between said valve and a part connected with the valve casing, said valve being provided on the face opposite that engaged by said resistance means with a recess and an aperture extending through the valve and provided with a valve seat, the lower pressure valve being movable into and out of engagement with said seat and having its outer face subjected at all times to the higher fluid pressure and provided with sealing means preventing the passage of higher fluid pressure into said recess when the higher pressure valve is closed, and having its inner face subjected to the pressure within said recess, auxiliary yielding resistance means interposed between said valves and having sufficient power to hold said second mentioned valve unseated against the maximum differential of fluid pressure on the opposite faces thereof, a hollow valve stem for said second mentioned valve provided with an aperture within the valve casing communicating with said recess, and an aperture exterior to said valve casing communicating with the source of lower fluid pressure, an operator operated part connected with said valve stem, the movement of said operator operated part to close said lower pressure valve effecting the connection of the operator operated part with said higher pressure valve, to permit the opening of the same, to effect a power stroke of the actuator piston, and the direction of said movement of the operator operated part and valves being in the same direction as the power stroke of the piston, the initial resistance of said main and auxiliary resistance springs to said movement of the operator operated part being increased substantially in proportion to the variation in the differential of fluid pressures on said valve, to enable the operator to determine the amount of pressure applied to the actuator piston and the part connected therewith and the force exerted by the operator to overcome said resistance being conserved and transmitted to the part to be operated.

4. In a power actuator, the combination of a cylinder closed at both ends, a piston therein, provided with means for connecting it with a part to be operated, controlling valve mechanism, and means for connecting the cylinder with sources of higher and lower fluid pressures under the control of said valve mechanism, said valve mechanism comprising among its members a valve casing operatively connected with and movable with the piston and provided with a valve seat within the casing and an aperture on each side of said seat, one communicating with the higher pressure source, and the other communicating with a portion of said cylinder, a higher pressure valve and a lower pressure valve of different sizes in said casing movable with and with respect thereto and with respect to each other, the higher pressure being larger than the lower pressure valve, and normally engaging said seat and having opposite faces of unequal effective pressure areas, a portion of one of said faces being always exposed to the higher fluid pressure, said valve face being provided with a recess, an aperture extending through the valve, and a valve seat therefor, and the other of said faces being exposed to the lower fluid pressure when the valve is seated and the valve mechanism is in normal or released position, yielding resistance means for normally seating said higher pressure valve against the maximum differential of fluid pressures thereon, said resistance means being capable of offering material resistance to the movement of said valve, in a direction away from its seat, when the fluid pressures on said valve are equalized and being nearly counterbalanced by the maximum differential of fluid pressures thereon, and being interposed between said valve and a part connected with the valve casing, the lower pressure valve having a portion to engage said seat and a portion having a sealing engagement with the wall of said recess and having its outer face subjected at all times to the higher pressure fluid, auxiliary yielding resistance means interposed between said valves and having sufficient power to hold said lower pressure valve unseated against the maximum differential of fluid pressures on said valve, said lower pressure valve being provided with a hollow valve stem having an aperture within the valve casing communicating with said recess and an aperture exterior to said valve casing communicating with the source of lower fluid, and an operator operated part connected with said valve stem, the movement of said operator operated part to seat the lower pressure valve effecting the connection of the operator operated part with the higher pressure valve to permit the opening of the same to effect a power stroke of the actuator piston, the initial resistance of said main and auxiliary resistance means to said movement of said valves, being increased substantially in proportion to the variation in the differential of fluid pressures on said valves to enable the operator to determine the amount of pressure applied to the actuator piston and the part connected therewith, and means for limiting the relative movement of said valve stem with respect to the valve casing to enable the operator to apply his physical force to the part to be operated in addition to any power exerted by the actuator and in case of failure of power, to vent the cylinder and apply the brakes by physical force alone.

5. In a power actuator, the combination of a cylinder closed at both ends, a piston therein, provided with means for connecting it with a part to be operated, controlling valve mechanism for the actuator, comprising a valve casing, connected with the piston and movable therewith and being provided with a valve seat within the same, an aperture on one side of said seat communicating with the cylinder on one side of the piston, and an aperture on the other side of said seat communicating with the source of higher fluid pressure, a higher pressure valve engaging said seat and having an inner face exposed at all times to the pressure within the portion of the cylinder in rear of the piston, and a portion of the exterior face of said valve being exposed at all times to the higher fluid pressure, said exterior face being provided with a recess, a passage for connecting said recess with the valve casing on the opposite face of said valve, and with said portion of the cylinder, and a valve seat surrounding said passage, yielding resistance means interposed between the inner face of said valve and the piston, normally holding said valve closed against the pressure of the higher pressure fluid, and having sufficient power to offer material resistance to the movement of said valve in a direction away from its seat, when the fluid pressures on opposite faces of said valve are equalized, and being nearly counterbalanced by the maximum differential of fluid pressures on the opposite faces of said valve, means for connecting the cylinder forward of the piston with the source of lower pressure, a lower pressure valve provided with a portion for engaging the valve seat in said recess and a portion having a sealing engagement with the wall of said recess, a hollow valve stem for said valve, provided with a passage for connecting said recess with the portion of said cylinder forward of the piston, whereby the piston is normally maintained submerged in the lower fluid pressure when the valve mechanism is in the normal or released position, auxiliary resistance means interposed between said valves and having sufficient strength to hold the lower pressure valve away from its seat against the maximum differential of fluid presures on said valve, and an operator operated part connected with said lower pressure valve, the movement of said operator operated part to seat the lower pressure valve effecting a connection of the operator operated part with the higher pressure valve, to permit the opening of the latter, the initial resistance of said resistance means to the movement of the operator operated part to close the lower pressure valve and open the higher pressure valve to effect a power stroke of the piston, being increased by the variations in the differential of fluid pressures on the opposite faces of said valves.

6. In brake mechanism for an automotive vehicle provided with an internal combustion engine having a carburetor, a suction passage therefrom to the engine cylinders, and a throttle valve for said passage, the combination of a power actuator comprising a cylinder closed at both ends, a piston therein, operatively connected with brake mechanism of the vehicle, controlling valve mechanism, means for connecting the cylinder on one side of the piston with the suction passage of the engine between the throttle valve and the engine cylinders, and for connecting the cylinder on the other side of the piston with the suction passage of the engine and with a source of higher fluid pressure under the control of said valve mechanism, said valve mechanism comprising a valve casing connected with the piston and provided with a valve seat within the same, and an aperture on one side of said seat, communicating with said last mentioned portion of the cylinder, and another aperture on the opposite side of said seat communicating with the source of higher pressure, a higher pressure valve, and a suction valve in said casing, the higher pressure valve normally engaging said seat and having opposite faces of unequal effective pressure areas exposed respectively to the higher fluid pressure and the suction of said suction passage when the valve is seated and the valve mechanism is in normal position, yielding resistance means normally seating said valve against the maximum differential of fluid pressures thereon, said resistance means being capable of offering material resistance to the movement of said valve in a direction away from its seat when the fluid pressures on opposite faces of said valve are equalized and being nearly counterbalanced by the maximum differential of fluid pressures thereon, and being interposed between said valve and the part connected with the valve casing, said valve being provided with an aperture therethrough, and provided on the face opposite that engaged by said yielding resistance means with a valve seat for said aperture, the suction valve being movable into and out of engagement with said seat and having its outer face subjected at all times to the higher fluid pressure, a recess being formed between said valves, sealing means between said recess and the suction valve, a hollow valve stem for said suction valve, provided with an aperture communicating with said recess between said valves, and an aperture communicating with said portion of cylinder connected with the suction passage, auxiliary yielding resistance means interposed between said valves and having sufficient power to hold said suction valve unseated against the maximum differential of fluid pressures on the opposite faces of said valve, and an operator operated part, connected with said valve stem, the movement of said operator operated part in a direction to seat said suction valve, effecting a connection between the operator operated part and the higher pressure valve to permit the opening of the latter after the suction valve has seated, to effect the power stroke of the piston, the initial resistance of said resistance means increasing by variations in the differential of fluid pressures on said valves in substantial proportion to the power exerted upon said piston and the brake mechanism connected therewith.

7. In brake mechanism for an automotive vehicle provided with an internal combustion engine having a carburetor, a suction passage leading to the engine cylinders, and a throttle valve for said passage, the combination of a power actuator comprising a cylinder closed at both ends, a piston therein operatively connected with brake mechanism of the vehicle, controlling valve mechanism for the actuator, means for connecting the cylinder forward of the piston with the suction passage of the engine between the throttle valve and the engine cylinders, and for connecting the cylinder in rear of the piston with the suction passage of the engine and with a source of higher fluid pressure under the control of said valve mechanism, said controlling valve mechanism comprising a valve casing connected with the piston and provided with a valve seat within the casing, an aperture on one side of said seat, communicating with the cylinder in rear of the piston, and an aperture on the other side of said seat, communicating with the source of higher pressure, a higher pressure valve for engaging said seat, having its inner face exposed to the pressure within the portion of the cylinder in rear of the piston, and its outer face exposed to the pressure of the higher pressure fluid, yielding resistance means normally seating said valve against the higher fluid pressure, interposed between said valve and the part connected with the piston and having sufficient power to offer material resistance to the movement of said valve in a direction away from its seat when the fluid pressures on opposite faces of the valve are equalized, and being nearly counterbalanced by the maximum differential of fluid pressures thereon, said valve having its outer face provided with a recess, a passage for connecting said recess with the portion of the valve casing on the opposite face of the valve, and a valve seat in said recess surrounding said passage, a suction valve in said recess having a portion for engaging said valve seat and having its outer face exposed to higher fluid pressure within said casing, auxiliary yielding resistance means interposed between said valves and having sufficient power to maintain the suction valve in open position against the maximum differential of fluid pressures on said valve, means for connecting said recess with the suction passage of the engine, and an operator operated part connected with the suction valve, the movement of said operator operated part to close the suction valve, effecting a connection between the operator operated part and the higher pressure valve to permit to be opened to effect the power stroke of the piston, the initial resistance of said resistance means being increased in opposition to said movement of the operator operated part by the variation in differential of fluid pressures on opposite faces of said valves in substantial proportion to the power exerted upon the piston and the brake mechanism connected therewith.

8. In brake mechanism for an automotive vehicle provided with an internal combustion engine having a carburetor, a suction passage leading to the engine cylinders, and a throttle valve for said passage, the combination of a power actuator comprising a cylinder closed at both ends, a piston in said cylinder operatively connected with brake mechanism of the vehicle, controlling valve mechanism for the actuator, means for connecting the cylinder forward of the piston with the suction passage, between the throttle valve and the engine cylinders, and for connecting the cylinder in rear of the piston with the suction passage and with a source of higher fluid pressure under the control of the said valve mechanism, said valve mechanism comprising a valve casing connected and movable with the piston, and provided with a valve seat, an aperture on one side of the valve seat connected with the cylinder in rear of the piston, and an aperture on the other side of the valve seat connected with the source of higher fluid pressure, a higher pressure valve in said casing normally engaging said seat and having its inner face exposed to pressure within said portion of the cylinder in rear of the piston and its exterior face exposed to the higher fluid pressure, yielding resistance means interposed between said valve and a part connected with the piston and normally seating said valve against the higher fluid pressure, said resistance means being capable of offering material resistance to the movement of said valve in a direction away from its seat when the fluid pressures on opposite faces of said valve are equalized, and being nearly counterbalanced by the maximum differential of fluid pressures thereon, said valve being provided on its outer face with a recess, a passage connecting the recess with the valve casing on the opposite face of the valve, and a valve seat surrounding said passage, a suction valve in said recess having a portion to engage said seat, and a portion having a sealing engagement with the wall of the recess, auxiliary yielding resistance means interposed between said valves and having sufficient power to hold the suction valve unseated against the maximum differential of fluid pressures on its opposite faces, the suction valve having its outer face exposed at all times to the higher fluid pressure and portions of its inner face exposed at all times to suction, said suction valve being provided with a passage connecting said recess with the cylinder on the forward side of the piston, whereby the piston will normally be maintained submerged in vacuum when the piston and valve mechanism are in released positions, and the power stroke of the piston may be effected without admitting any appreciable amount of higher pressure fluid to the suction passage, and an operator operated part connected with said suction valve, the movement of the suction valve into closed position effecting a connection between the operator operated part and the higher pressure valve to permit the opening thereof to effect the power stroke of the piston, the initial resistance to the movement of the operator operated part to close the suction valve and open the higher pressure valve being gradually increased by the variations in the differential of fluid pressures on opposite faces of said valves in substantial proportion to the pressure exerted upon the piston and brake mechanism.

9. In brake mechanism for an automotive vehicle provided with an internal combustion engine having a carburetor, a suction passage leading to the engine cylinders, and a throttle valve for said passage, the combination of a power actuator comprising a cylinder closed at both ends, a piston in said cylinder operatively connected with brake mechanism of the vehicle, controlling valve mechanism for the actuator, means for connecting the cylinder forward of the piston with the suction passage, between the throttle valve and the engine cylinders, and for connecting the cylinder in rear of the piston with the suction passage and with a source of higher fluid pressure under the control of the said valve mechanism, said valve mechanism comprising a valve casing connected and movable with the piston, and provided with a valve seat, an aperture on one side of the valve seat connected with the cylinder in rear of the piston, and an aperture on the other side of the valve seat connected with the source of higher fluid pressure, a higher pressure valve in said casing normally engaging said seat and having its inner face exposed to pressure within said portion of the cylinder in rear of the piston and its exterior face exposed to the higher fluid pressure, yielding resistance means interposed between said valve and a part connected with the piston and normally seating said valve against the higher fluid pressure, said resistance means being capable of offering material resistance to the movement of said valve in a direction away from its seat when the fluid pressures on opposite faces of said valve are equalized, and being nearly counterbalanced by the maximum differential of fluid pressures thereon, said valve being provided on its outer face with a recess, a passage connecting the recess with the valve casing on the opposite face of the valve, and a valve seat surrounding said passage, a suction valve in said recess having a portion to engage said seat, and a portion having a sealing engagement with the wall of the recess, auxiliary yielding resistance means interposed between said valves and having sufficient power to hold the suction valve unseated against the maximum differential of fluid pressures on its opposite faces, the suction valve having its outer face exposed at all times to the higher fluid pressure and portions of its inner face exposed at all times to suction, said suction valve being provided with a passage connecting said recess with the cylinder on the forward side of the piston, whereby the piston will normally be maintained submerged in vacuum when the piston and valve mechanism are in released positions, and the power stroke of the piston may be effected without admitting any appreciable amount of higher pressure fluid to the suction passage, and an operator operated part connected with said suction valve, the movement of the suction valve into closed position effecting a connection between the operator operated part and the higher pressure valve to permit the opening thereof to effect the power stroke of the piston, the initial resistance to the movement of the operator operated part to close the suction valve and open the higher pressure valve being gradually increased by the variations in the differential of fluid pressures on opposite faces of said valves in substantial proportion to the pressure exerted upon the piston and brake mechanism, and means for limiting the movement of the operator operated part with respect to the piston, to enable the operator to apply his physical force to the brake mechanism in addition to that exerted by the actuator and to operate the valve mechanism to vent the cylinder and apply the brakes by his physical force in case of failure of power.

10. In brake mechanism for automotive vehicles provided with an internal combustion engine having a carburetor, a suction passage therefrom to the engine cylinders, and a throttle valve for said passage, the combination of a power actuator comprising a cylinder closed at both ends, a piston in said cylinder provided with means for connecting it with brake mechanism of the vehicle and controlling valve mechanism, means for connecting the cylinder forward of the piston with the suction passage and for connecting the cylinder in rear of the piston with the suction passage and with a source of higher pressure under the control of said valve mechanism, said valve mechanism comprising a valve casing connected to and movable with the piston, and provided with a valve seat, said casing being connected forward of said seat with the portion of the cylinder in rear of the piston, and connected in rear of said seat at all times with the higher pressure fluid source, said valve having on its rear face a recess, open at its rear end, and having a passage through the valve, for placing said recess in communication with the portion of the casing forward of the valve, and being provided with a suction valve seat for said passage within said recess, a suction valve of smaller diameter than the higher pressure valve closing the rear end of said recess, having portions to engage the suction valve seat and having portions in sealing engagement with the higher pressure valve, the rear face of the suction valve, and the portions of the rear face of the higher pressure valve exterior to the suction valve being subjected at all times to the higher fluid pressure, means for connecting the interior of said recess, between said valves at all times with the portion of the cylinder forward of the piston, and thereby connecting it with the suction passage, the passage through the higher pressure valve serving to connect the cylinder in rear of the piston with the suction passage when the suction valve is open, to maintain the piston submerged in vacuum when the piston and valves are in normal or released position, a main spring, resistance means interposed between the higher pressure valve and a part connected with the casing, and acting on the valve in a direction to seat it, an auxiliary resistance means interposed between said valves, and acting on the suction valve in a direction to unseat it, said main resistance means having sufficient power to offer material resistance to the movement of the higher pressure valve in a direction away from its seat, when the fluid pressures on opposite sides of said valves are equalized and being nearly counterbalanced by the higher fluid pressure on the outer faces of said valves, the pressure of said auxiliary resistance means being nearly counterbalanced by the differential of fluid pressure on opposite faces of the suction valve, and an operator operated part connected with the suction valve, for moving it into seating engagement with the higher pressure valve and opening the latter to produce a power stroke of the piston, the light initial resistance of said resistance means to such movement of the operator operated part being increased by the variations in the differential of fluid pressures on opposite faces of said valves, in substantial accordance with the power exerted by the actuator piston.

11. In brake mechanism for automotive vehicles provided with an internal combustion engine having a carburetor, a suction passage therefrom to the engine cylinders, and a throttle valve for said passage, the combination of a power actuator comprising a cylinder closed at both ends, a piston in said cylinder provided with means for connecting it with brake mechanism of the vehicle and controlling valve mechanism, means for connecting the cylinder forward of the piston with the suction passage and for connecting the cylinder in rear of the piston with the suction passage and with a source of higher pressure under the control of said valve mechanism, said valve mechanism comprising a valve casing connected to and movable with the piston, and provided with a valve seat, said casing being connected forward of said seat with the portion of the cylinder in rear of the piston, and connected in rear of said seat at all times with the higher pressure fluid source, said valve having on its rear face a recess, open at its rear end, and having a passage through the valve, for placing said recess in communication with the portion of the casing forward of the valve, and being provided with a suction valve seat for said passage within said recess, a suction valve of smaller diameter than the higher pressure valve closing the rear end of said recess, having portions to engage the suction valve seat and having portions in sealing engagement with the higher pressure valve, the rear face of the suction valve, and the portions of the rear face of the higher pressure valve exterior to the suction valve being subjected at all times to the higher fluid pressure, means for connecting the interior of said recess, between said valves at all times with the portion of the cylinder forward of the piston, and thereby connecting it with the suction passage, the passage through the higher pressure valve serving to connect the cylinder in rear of the piston with the suction passage when the suction valve is open, to maintain the piston submerged in vacuum when the piston and valves are in normal or released position, a main spring, resistance means interposed between the higher pressure valve and a part connected with the casing, and acting on the valve in a direction to seat it, an auxiliary resistance means interposed between said valves, and acting on the suction valve in a direction to unseat it, said main resistance means having sufficient power to offer material resistance to the movement of the higher pressure valve in a direction away from its seat, when the fluid pressures on opposite sides of said valves are equalized, and being nearly counterbalanced by the higher fluid pressure on the outer faces of said valves, the pressure of said auxiliary resistance means being nearly counterbalanced by the differential of fluid pressure on opposite faces of the suction valve, and an operator operated part connected with the suction valve, for moving it into seating engagement with the higher pressure valve and opening the latter to produce a power stroke of the piston, said connections permitting both valves to be simultaneously seated, the initial pressure of said resistance means being increased by variations in the differential of fluid pressure on opposite faces of said valve, and the seating of the higher pressure valve without opening the suction valve, transferring the resistance of said main resistance means from the operator operated part to the valve casing, while maintaining the predetermined differential of fluid pressures on the piston and on said valves.

12. In brake mechanism for automotive vehicles provided with an internal combustion engine having a carburetor, a suction passage therefrom to the engine cylinders, and a throttle valve for said passage, the combination of a power actuator comprising a cylinder closed at both ends, a piston in said cylinder provided with means for connecting it with brake mechanism of the vehicle and controlling valve mechanism, means for connecting the cylinder forward of the piston with the suction passage and for connecting the cylinder in rear of the piston with the suction passage and with a source of higher pressure under the control of said valve mechanism, said valve mechanism comprising a valve casing connected to and movable with the piston, and provided with a valve seat, said casing being connected forward of said seat with the portion of the cylinder in rear of the piston, and connected in rear of said seat at all times with the higher pressure fluid source, said valve having on its rear face a recess, open at its rear end, and having a passage through the valve, for placing said recess in communication with the portion of the casing forward of the valve, and being provided with a suction valve seat for said passage within said recess, a suction valve of smaller diameter than the higher pressure valve closing the rear end of said recess, having portions to engage the suction valve seat and having portions in sealing engagement with the higher pressure valve, the rear face of the suction valve, and the portions of the rear face of the higher pressure valve exterior to the suction valve being subjected at all times to the higher fluid pressure, means for connecting the interior of said recess, between said valves at all times with the portion of the cylinder forward of the piston, and thereby connecting it with the suction passage, the passage through the higher pressure valve serving to connect the cylinder in rear of the piston with the suction passage when the suction valve is open, to maintain the piston submerged in vacuum when the piston and valves are in normal or released position, a main spring, resistance means interposed between the higher pressure valve and a part connected with the casing, and acting on the valve in a direction to seat it, an auxiliary resistance means interposed between said valves, and acting on the suction valve in a direction to unseat it, said main resistance means having sufficient power to offer material resistance to the movement of the higher pressure valve in a direction away from its seat, when the fluid pressures on opposite sides of said valves are equalized, and being nearly counterbalanced by the higher fluid pressure on the outer faces of said valves, the pressure of said auxiliary resistance means being nearly counterbalanced by the differential of fluid pressure on opposite faces of the suction valve, and an operator operated part connected with the suction valve, for moving it into seating engagement with the higher pressure valve and opening the latter to produce a power stroke of the piston, said connections permitting both valves to be simultaneously seated, the initial pressure of said resistance means being increased by variations in the differential of fluid pressure on opposite faces of said valve, and the seating of the higher pressure valve without opening the suction valve, transferring the resistance of said main resistance means from the operator operated part to the valve casing, while maintaining the predetermined differential of fluid pressures on the piston and on said valves, and means for limiting the relative movement between the piston and the operator operated part to enable the operator to add his physical force to the brake mechanism in addition to any power exerted by the actuator, and in case of failure of power to vent the cylinder and apply the brakes by his physical force.

13. Valve mechanism for controlling the operation of fluid pressure actuators comprising a casing, high and low pressure valves movably mounted therein and arranged to control differentials of fluid pressure to said actuator, means for connecting said casing with sources of higher and lower fluid pressure, said valves being normally subjected to the maximum differential of fluid pressures, and resistance elements slightly overbalancing the differentials on said valves when said differential is at maximum together with an operator operated part for operating said valves against said resistance elements.

14. Valve mechanism for controlling the operation of fluid pressure actuators comprising a valve casing, high and low pressure valves arranged to move therein and to control differentials of fluid pressure to said actuator, sources of high and low pressure connected to said casing, said valves being subjected normally to maximum differentials of pressure, a resistance element arranged to slightly overbalance the differential of pressure on the high pressure valve, an auxiliary resistance element arranged to slightly overbalance the differentials of pressure on the low pressure valve, and an operator operated part for operating said valves to control differentials of fluid pressure to the actuator.

15. Valve mechanism for controlling the operation of fluid pressure actuators comprising a valve casing, high and low pressure valves movably mounted therein, means for connecting said casing with sources of higher and lower pressure, said valve being subjected when in normal position to maximum differentials of fluid pressure, a resistance element slightly overbalancing the differential of pressure on the high pressure valve, an auxiliary resistance element slightly overbalancing the differential of pressure on the low pressure valve, and an operator operated part connected to the low pressure valve, and arranged to sequentially overcome the auxiliary resistance element and the resistance element of the high pressure valve to control differentials of fluid pressure to the actuator to produce a power stroke thereof.

16. Valve mechanism for controlling the operation of fluid pressure actuators comprising a valve casing, high and low pressure valves arranged therein, means for connecting said casing with higher and lower fluid pressures, said valves being subjected when in normal position to maximum differentials of fluid pressure, a main resistance element interposed between the high pressure valve and the casing and slightly overbalancing maximum differentials of pressure on said high pressure valve, an auxiliary resistance element arranged between the high pressure valve and the low pressure valve and slightly overbalancing the differentials of pressure on said low pressure valve, a stop on said high pressure valve and an operator operated part connected with the low pressure valve and arranged to bring the same into engagement with the stop on the high pressure valve to sequentially overcome the auxiliary element and the main resistance element to control differentials of pressure to the actuator.

17. Valve mechanism for controlling the operation of fluid pressure actuators comprising a valve casing, a high pressure valve movably mounted therein and provided with a recess having a seat, a low pressure valve slidably mounted in the recess and arranged to engage said seat, means for connecting the casing with differentials of fluid pressure, said valves being subjected to maximum differentials of fluid pressure when in normal retracted position, a main resistance element interposed between the high pressure valve and the casing and arranged to slightly overbalance the differentials of fluid pressure on said high pressure valve, an auxiliary resistance element arranged in said recess between the high pressure valve and the low pressure valve and adapted to slightly overcome the differentials of pressure on said low pressure valve, and an operator operated part connected with said low pressure valve and arranged to bring the same into engagement with said seat to sequentially overcome the auxiliary resistance element and the main resistance element to control differentials of fluid pressure to the actuator, said resistance elements reacting against the operator operated part in proportion to the decrease in differentials of pressure on said valves.

In testimony whereof we affix our signatures.

CALEB S. BRAGG.
VICTOR W. KLIESRATH.